(12) United States Patent
Ramachandran

(10) Patent No.: US 8,175,435 B2
(45) Date of Patent: May 8, 2012

(54) OPTICAL FIBERS AND OPTICAL FIBER DEVICES WITH TOTAL DISPERSION GREATER THAN MATERIAL DISPERSION

(75) Inventor: Siddharth Ramachandran, Hoboken, NJ (US)

(73) Assignee: OFS Fitel, LLC, Norcross, GA (US)

(*) Notice: Subject to any disclaimer, the term of this patent is extended or adjusted under 35 U.S.C. 154(b) by 480 days.

(21) Appl. No.: 12/147,806

(22) Filed: Jun. 27, 2008

(65) Prior Publication Data

US 2009/0034925 A1 Feb. 5, 2009

Related U.S. Application Data

(63) Continuation of application No. 11/367,495, filed on Mar. 4, 2006, now abandoned.

(51) Int. Cl.
*G02B 6/02* (2006.01)
*G02B 6/036* (2006.01)
(52) U.S. Cl. ........................... 385/123; 385/127
(58) Field of Classification Search .................. 385/123, 385/126, 127; 398/146–148
See application file for complete search history.

(56) References Cited

U.S. PATENT DOCUMENTS

| 6,097,870 A * | 8/2000 | Ranka et al. ................. 385/127 |
| 6,766,088 B2 * | 7/2004 | Hasegawa et al. ............ 385/123 |
| 7,103,251 B2 * | 9/2006 | Bickham et al. .............. 385/127 |
| 7,272,286 B2 * | 9/2007 | Provost et al. ................ 385/123 |
| 7,668,428 B2 * | 2/2010 | Miyabe et al. ................ 385/125 |
| 7,693,379 B2 * | 4/2010 | Imamura ...................... 385/125 |
| 2010/0086251 A1 * | 4/2010 | Xu et al. ........................ 385/1 |

OTHER PUBLICATIONS

Encyclopedia of Laser Physics, Higher-order Modes entry, RP Photonics (http://rp-photonics.com/higher_order_modes.html).*
J.K. Ranka, "Optical properties of high-delta air-silica microstructure optical fibers", Jun. 1, 2000, Optics Letters, vol. 25, No. 11, pp. 796-798.*

* cited by examiner

*Primary Examiner* — Uyen Chau N Le
*Assistant Examiner* — John M Bedtelyon

(57) ABSTRACT

Disclosed are optical fiber devices incorporating optical fibers with total dispersion greater than material dispersion, and with preferred dispersion values less than +50 ps/nm-km. The desired dispersion values are obtained when light resides substantially in a single higher order mode (HOM) of the fiber, typically the $LP_{02}$ mode. The optical fibers also preferably have substantial separation between the effective indices of the HOM and any other mode.

10 Claims, 4 Drawing Sheets

(a)

(b)

(c)

Figure 1:
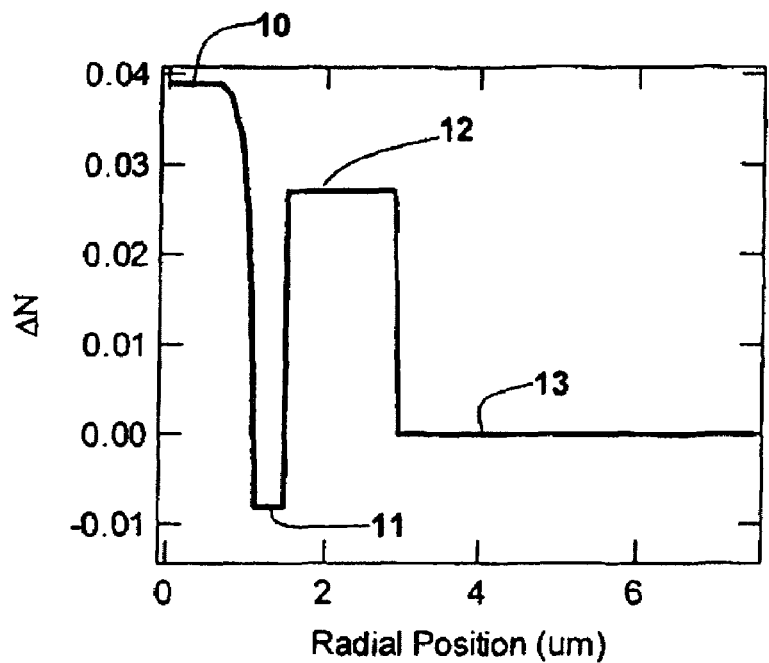

OPTICAL FIBERS AND OPTICAL FIBER DEVICES WITH TOTAL DISPERSION GREATER THAN MATERIAL DISPERSION

CROSS-REFERENCE TO RELATED APPLICATIONS

This application is a continuation of U.S. patent application Ser. No. 11/367,495, filed on Mar. 4, 2006, now abandoned and having the title "Optical Fibers and Optical Fiber Devices with Total Dispersion Greater than Material Dispersion," which is incorporated by reference herein as if expressly set forth herein in its entirety.

FIELD OF THE INVENTION

The invention relates to optical fibers devices wherein the total dispersion of the device is greater than the material dispersion.

BACKGROUND OF THE INVENTION

An optical fiber can guide light with multiple spatial patterns, each of which is uniquely designated as a transverse mode of the fiber (hereafter, called mode, for brevity). The dispersive characteristics of an optical signal in a fiber depend on the mode in which it is travelling. Thus, each mode may be characterised with a dispersion value specific to it. The dispersion of a mode is roughly equal to the sum of the material dispersion ($D_m$) and waveguide dispersion ($D_w$). The material dispersion is the dispersion of the material in which the optical signal resides—that is, the material of which the fiber is made (most commonly, Silica with trace amounts of Germanium, Phosphorus, Fluorine and other dopants). The waveguide dispersion is due to the refractive index profile that defines a fiber waveguide. Hence, the dispersion of a mode ($D_{total}=D_m+D_w$) can be designed by suitably altering the refractive index profile of the fiber (which modifies $D_w$). As will be explained below, for most optical fiber designs, the waveguide dispersion $D_w$, is negative. Hence, while the refractive index profile of a fiber can designed to obtain extremely large, negative values of $D_w$, and hence the fiber dispersion $D_{total}$, of varying negative magnitudes can be achieved, most fibers are bounded by the material dispersion, in maximum achievable dispersion. Silica, even with a variety of dopants, has $D_m>0$ for wavelengths greater than roughly 1300 nm, and has $D_m<0$ for wavelengths below 1300 nm. Hence, most optical fibers can achieve positive or negative dispersion ($D_{total}$) for wavelengths greater than 1300 nm, but possess only $D_{total}<0$ for wavelengths below 1300 nm.

The optical response of an optical pulse in a fiber depends critically on the dispersion it experiences. This is true for both linear effects such as pulse spreading, and nonlinear effects such as pulse distortion and soliton formation. Hence, the dispersion of a fiber plays a key role in designing fiber-based devices. Whereas optical fiber communications systems typically operate at 1300 nm or between 1500 and 1650 nm, many other important optical systems operate at lower wavelengths. A preferred wavelength of operation for fiber lasers is at 1060 nm. The ubiquitous titanium-doped sapphire laser, which is used in several pump-probe experiments as well as in biomedical imaging or therapy, typically operates in wavelength range of 700 nm to 1000 nm. Finally, all wavelengths visible to the human eye, and hence wavelengths at which several commercial gadgets such as the laser pointer work, spans the range of 400 to 700 nm. Common to all these applications is a wavelength of operation below 1300 nm; where the silica fiber offers only negative dispersion. Fibers that have positive or zero dispersion in these wavelength ranges would enable propagation of solitons and generate broadband supercontinua, of interest to biomedical imaging systems, for instance. For many of these systems, positive but low dispersion fibers are required at these wavelengths. Hence, there is a need for optical fibers that can provide stable propagation for optical pulses of wavelength less than 1300 nm, whose dispersion is positive and can be adjusted by suitably designing the refractive index profile. This requires a fiber whose waveguide dispersion $D_w$ can be designed to be greater than zero in any desired wavelength range.

Most optical fibers are single-moded, which means that they support only the lowest order, fundamental mode, also designated as the $LP_{01}$ mode. The two numerals in the subscript refer to the number of intensity minimas (zeroes) the spatial light pattern has, in the azimuthal ($1^{st}$ subscript) and radial ($2^{nd}$ subscript) directions, respectively. As mentioned earlier, the $LP_{01}$ in standard silica fibers where the refractive index profile is defined by various dopants to silica, can achieve only $D_w<0$. Thus, the entire class of these fibers can have a maximum $D_{total}=D_m$, the material dispersion of silica. Since $D_m<0$ for wavelengths<1300 nm, it is not possible to achieve $D_{total}>0$ in this wavelength range.

Fibers that contain air holes that extend longitudinally along the axis of the fiber (called air-silica fibers, hereafter) possess interesting properties, as described by J. C. Knight and coworkers in volume 12, page 807 of the July 2000 issue of the *IEEE Photonics Technology Letters*, entitled "Anomalous Dispersion in Photonic Crystal Fiber." They demonstrate that air-silica fibers can achieve large positive dispersion in any wavelength range. However, the dispersion of air-silica fibers is closely tied to their modal areas, and it is not possible to achieve high dispersion as well as large effective modal areas—hence, this design space would be of limited use in systems requiring high positive dispersion but also low nonlinearities. In addition, these fibers are known to have high birefringence and loss, both of which diminish their utility in practical systems. Moreover, an all-solid fiber made by conventional technology will always be cheaper than fibers that require manual assembly of the fiber preforms (as is the case with air-silica fibers). These fibers also have termination problems—splices to other fibers lead to loss, changes in optical properties, and cannot be made reliably.

Lysiansky, Rosenblit and Wei disclosed an alternative technique to obtain $D_w>0$. In U.S. Pat. No. 6,724,964, they disclosed exemplary refractive index profiles of a solid (i.e. not air-silica) fiber that supports higher order modes (HOM) in addition to the $LP_{01}$ mode, where the waveguide design yields dispersion greater than +50 ps/nm-km for the $LP_{02}$ or $LP_{03}$ mode. However, these designs do not enable achieving zero or low positive dispersion values in the wavelength range<1300 nm, and hence cannot be utilized for applications such as soliton compression and supercontinuum generation, typically exploited with lasers in the wavelength range of 700-900 nm. In addition, these HOM fibers suffer from a severe drawback common to most fibers that support more than a single mode. While it is desired to have light residing substantially in the desired HOM, the presence of other modes makes such designs susceptible to mode coupling, by which process light can either be lost or can cause deleterious interference-noise problems. Such mode coupling increases as the difference in effective index ($n_{eff}$) between the desired modes and any other mode, decreases. The design space disclosed by the above authors leads to identical $n_{eff}$ for the $LP_{02}$ and $LP_{11}$ modes, at the operation wavelengths. Hence these designs are especially susceptible to both interference noise and loss.

Hence, there exists the need for a fiber that can be manufactured by conventional fabrication techniques, whose refractive index profile is such that it yields not only positive dispersion of any magnitude in any wavelength range, but also ensures that the modal spacings in the fiber are such that the fiber is not susceptible to mode coupling.

SUMMARY OF INVENTION

The present invention is directed to optical fiber devices incorporating optical fibers with refractive index profiles that yield $D_{total} > D_m$ in any wavelength range such that $D_{total} < +50$ ps/nm-km, as would be desired in a variety of fiber devices exploiting optical nonlinearities. The aforementioned refractive index profile yields the given dispersion values when light resides substantially in a single higher order mode (HOM) of the fiber. Typically, this HOM would be the $LP_{02}$ mode of the fiber, but those skilled in the art will realize that such designs can be extended to other HOMs, such as the $LP_{11}$ or the $LP_{03}$ modes. We show exemplary profiles that provide small positive $D_{total}$ (<+50 ps/nm-km) in the wavelength range of 820-900 nm, as well as 1040-1160 nm, since these wavelength ranges are especially of interest for nonlinear fiber-optical devices, and it is in these wavelength ranges that conventional silica fiber has $D_{total} < 0$, motivating the need for alternatives.

Also disclosed here is a refractive index profile that yields $D_{total} > D_m$ in any wavelength range, with no constraints on the magnitude of dispersion $D_{total}$, but that simultaneously yields stable, mode-coupling-free propagation of the signal. To achieve the latter characteristic, the fiber designs are constrained to those that additionally achieve a difference in $n_{eff}$ (designated as $\Delta n_{eff}$ hereafter) between the desired HOM and any other mode, of an absolute value greater than $10^{-4}$. Fibers, as those whose designs are disclosed here, that achieve $D_{total} > 0$ and absolute value of $\Delta n_{eff} > 10^{-4}$ will enable a variety of fiber devices in the wavelength ranges<1300 nm, for which only bulk-optic devices exist currently.

The present invention also relates to an apparatus for obtaining a device with $D_{total} > D_m$ comprising the fiber and at least one mode converter that converts the incoming light into the desired HOM of the fiber, such that light propagation occurs substantially in the desired mode. In some cases, this device will also comprise a mode converter at the output of the device, so as to obtain a familiar Gaussian spatial pattern of light out of the device.

In one embodiment, the mode converter is a static or tunable long-period fiber grating.

DETAILED DESCRIPTION OF INVENTION

FIG. 1 shows the index profile of a fiber that supports more than one mode, but which is designed to yield desired the $D_{total}$ for the $LP_{02}$ mode. The refractive index profile comprises a core, 10, with $\Delta N$ of 0.039 extending to a radial position of 1 µm; followed by a trench region (down-doped ring), 11, with $\Delta N$ of −0.008 and a thickness of 0.5 µm; followed by an up-doped ring, 12, with $\Delta N$ of 0.027 and a thickness of 1.4 µm. Thereafter, the fiber cladding, consisting only of silica glass, 13, extends to the edge of the glass cladding of the fiber. For typical fibers, this extends to a radial position of 62.5 µm. The profile in FIG. 1 is shown only till a radial position of 7 µm because the rest of the fiber is merely an extension of the silica glass cladding. The refractive index profile is characterized in terms of $\Delta N$, the difference in refractive index between the region of interest and the silica cladding.

Figure 2:
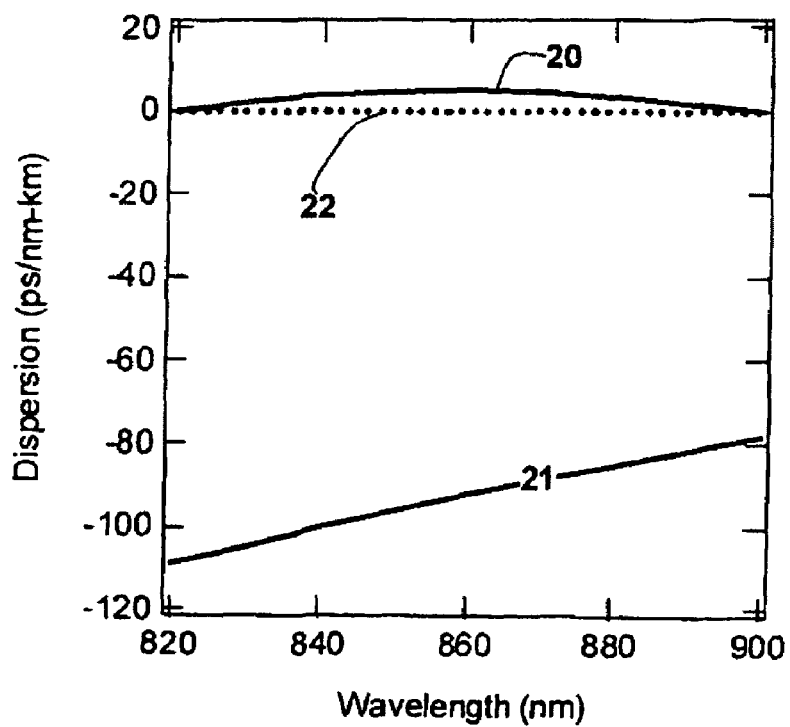

FIG. 2 shows the dispersion as a function of wavelength, of the $LP_{02}$ mode, 20, for the fiber described in FIG. 1. Also shown is the material dispersion of silica (21), which is highly negative in the wavelength range of 820-900 nm. As a reference, FIG. 2 also shows a dashed line (22), which denotes the zero dispersion line. From this Figure, it is apparent that the $LP_{02}$ mode of this fiber has large waveguide dispersion $D_w$. This is because the dispersion of this mode ($D_{total}$), varies between zero and approximately +5 ps/nm-km, whereas the material dispersion $D_m$ for the medium varies between −78 ps/nm-km and −109 ps/nm-km, in this wavelength range. Since $D_{total} = D_m + D_w$, and $D_m$ is highly negative, $D_w$ must be large and positive in order to yields $D_{total}$ that is small and positive.

Those skilled in the art will realize that the waveguide dispersion of a medium is approximately constant with respect to a complimentary scaling of waveguide dimensions and wavelength of operation, as described in detail by Snyder and Love in *Optical Waveguide Theory*, Chapman and Hall, New York, 1983. The complimentary scaling concept states that a waveguide has approximately the same waveguide dispersion $D_w$, for a given ratio of the dimensional scale of the waveguide to the wavelength of operation. Hence, those skilled in the art will realise that while FIG. 1 describes a fiber that yields small positive dispersion in the 800-900 nm wavelength range, appropriately scaling the radial dimensions of the refractive index profile will yield a similar waveguide that yields the same magnitude of $D_w$ for the $LP_{02}$ mode at an alternative wavelength. Thus, this design template may be used to obtain small positive dispersion in any desired wavelength range<1300 nm.

Furthermore, FIG. 2 shows that the dispersion slope, as defined by the derivative of $D_{total}$ with respect to wavelength, is zero, negative, or positive, depending on the wavelength of operation. Hence, with aid of the complimentary scaling concept, it is evident that this design class can yield dispersion slope of any sign (including zero), while simultaneously yielding small, positive $D_{total}$ for wavelength ranges<1300 nm.

Figure 3:
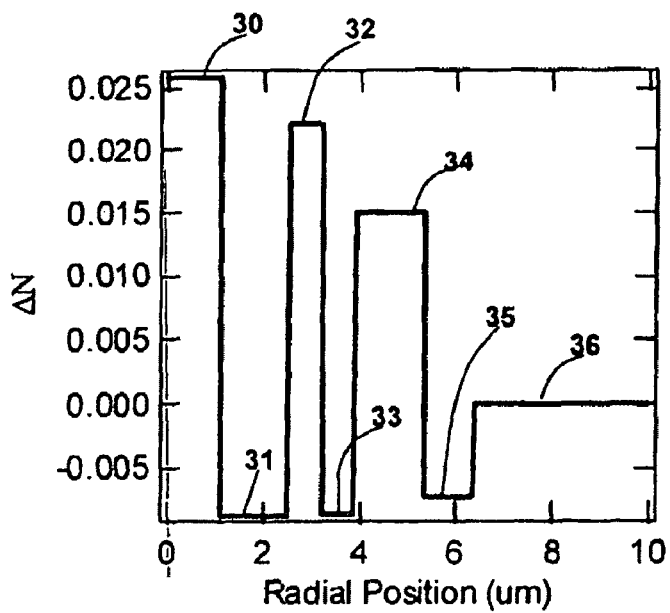

FIG. 3 shows the index profile of a fiber that supports more than one mode, but which is designed to yield desired $D_{total}$ for the $LP_{02}$ mode, while additionally ensuring that the optical signal is stable with respect mode coupling. The refractive index profile comprises a core, 30, with $\Delta N$ of 0.026 extending to a radial position of 1.1 µm; followed by a trench region, 31, with $\Delta N$ of −0.0087 and a thickness of 1.4 µm; followed by an up-doped ring, 32, with $\Delta N$ of 0.022 and a thickness of 0.7 µm; followed by a trench region, 33, with $\Delta N$ of −0.0085 and a thickness of 0.7 µm; followed by an up-doped ring, 34, with $\Delta N$ of 0.015 and a thickness of 1.44 µm; followed by a trench region, 35, with $\Delta N$ of −0.0073 and a thickness of 1 µm. Thereafter, the fiber cladding, 36, consisting only of silica glass, extends to the edge of the glass cladding of the fiber.

Figure 4:
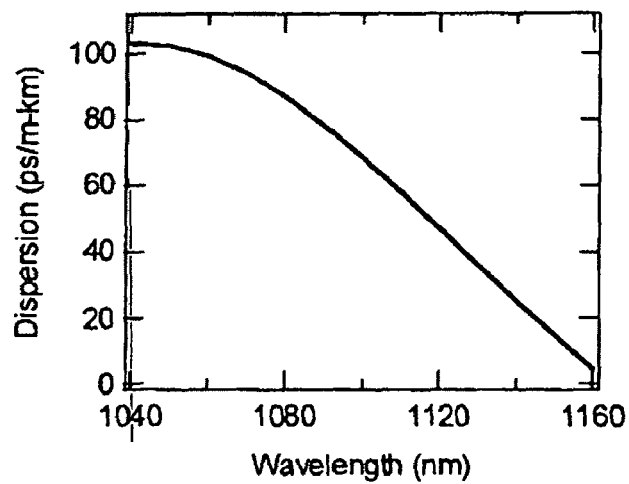

FIG. 4 shows the dispersion $D_{total}$, for the $LP_{02}$ mode of the waveguide described in FIG. 3. As is evident, the $LP_{02}$ mode has large positive dispersion, up to a magnitude of +100 ps/nm-km, at the wavelength of 1040 nm. In addition, it has positive dispersion in a wavelength range spanning 120 nm, from 1040 nm to 1160 nm.

Figure 5:
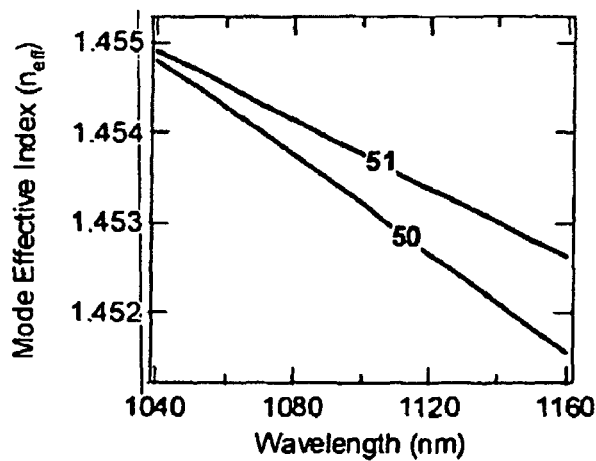

FIG. 5 show the effective indices $n_{eff}$, of two different modes for the fiber shown in FIG. 3. Line 50 is the $n_{eff}$ of the $LP_{02}$ mode, which has the large positive $D_{total}$, and which is the desired mode of operation, and line 51 is the $n_{eff}$ for the $LP_{11}$ mode, which has $n_{eff}$ values closest to those of the desired $LP_{02}$ mode of this fiber. As is evident from this fiber, the difference in $n_{eff}$ between the two modes is greater than $10^{-4}$ over the entire preferred wavelength range of operation, spanning from 1040 nm to 1160 nm. This large separation between the $LP_{02}$ mode and any other guided mode of this fiber ensures that light propagating in the $LP_{02}$ mode will not easily couple to any other mode of this fiber, hence ensuring stable, mode-coupling-free, low-loss propagation of the optical signal. The $n_{eff}$ of other guided modes in this fiber were not plotted in FIG. 5, because their separation from the $LP_{02}$ mode is even larger, and hence do not contribute to instabilities due to mode coupling. In general, for this class of fiber designs, it is usually necessary to calculate the $n_{eff}$ of every guided mode, and ensure that the smallest difference in $n_{eff}$ between the desired HOM and any other mode exceeds $10^{-4}$.

Figure 6:
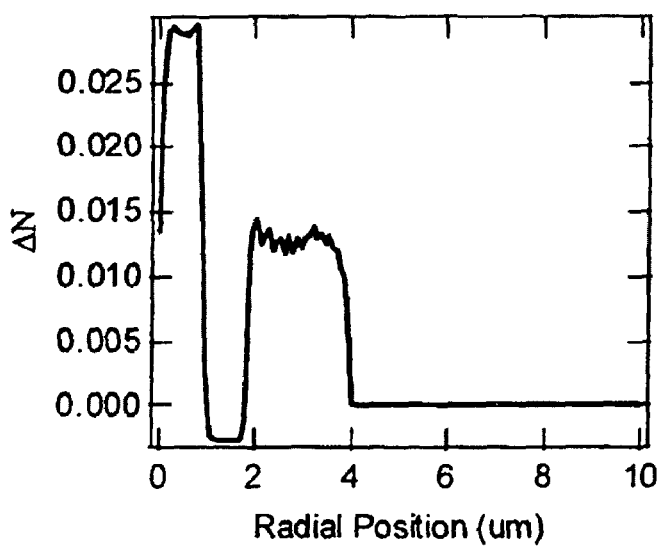
Figure 7:
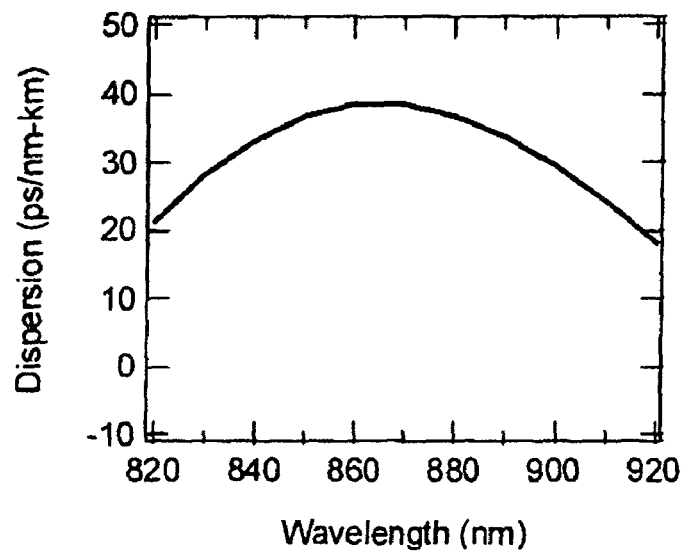

Described thus far are two exemplary fiber refractive index profiles. One yields $D_{total}$ greater than the material dispersion $D_m$, of the medium (usually silica, with trace dopants), but $D_{total}$<50 ps/nm-km, in the wavelength range<1300 nm. The other provides for dispersion $D_{total}$>material dispersion $D_m$, with arbitrarily high positive values for $D_{total}$, at wavelengths<1300 nm, such that $\Delta n_{eff}$ between the desired and parasitic modes is always>$10^{-4}$, so as so ensure stable operation. FIG. 6 shows the refractive index profile of a fabricated fiber preform that yields an $LP_{02}$ mode which satisfies both the above conditions. FIG. 7 shows the dispersion of the $LP_{02}$ mode ($D_{total}$) for the fiber represented in FIG. 6. The $LP_{02}$ mode has dispersion $D_{total}$<+40 ps/nm-km, for the wavelength range spanning 100 nm from 820-920 nm. Hence, this yields a fiber with low positive dispersion in a wavelength range where the material dispersion is large and negative (approximately −100 ps/nm-km, as shown in FIG. 2). Note that the dispersion curve shown in FIG. 7 (as well as the curve shown in FIG. 2) has a turnover region in the wavelength range of interest, i.e. at the operating wavelength.

Figure 8:
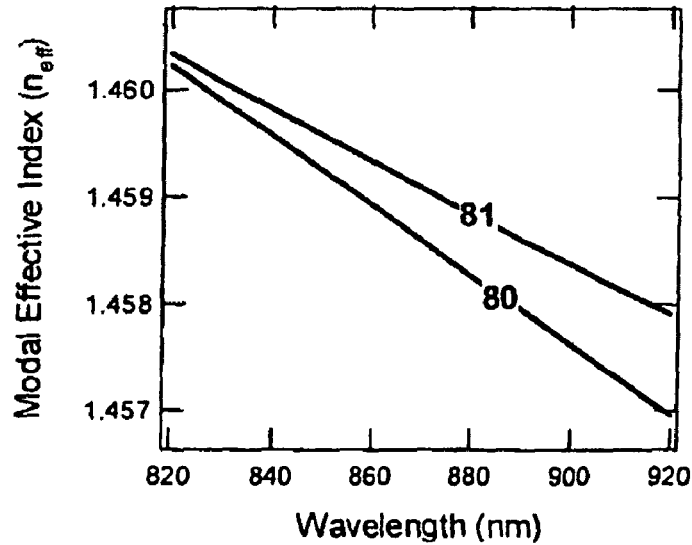

FIG. 8 shows the $n_{eff}$ of the $LP_{02}$ mode (80) and $LP_{11}$ mode (81), respectively. As in the case of the fiber shown in FIGS. 3, 4, and 5, the $LP_{11}$ mode has $n_{eff}$ closest to the $LP_{02}$ mode of this fiber, and hence it suffices to study their difference to evaluate the resistance to mode coupling here. From FIG. 8, it can be inferred that the difference in $n_{eff}$ ($\Delta n_{eff}$) is greater than $10^{-4}$ over the entire desired wavelength of operation, spanning from 820-920 nm.

All the discussion above described fibers in which the preferred mode of operation was the $LP_{02}$ mode. The same design techniques may be implemented to yield a fiber in which propagation occurs in another higher order mode, possessing the dispersive and stability characteristics described above.

Figure 9:
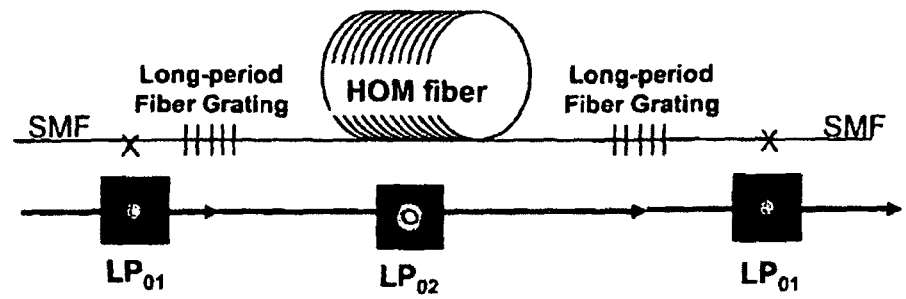
Figure 9:
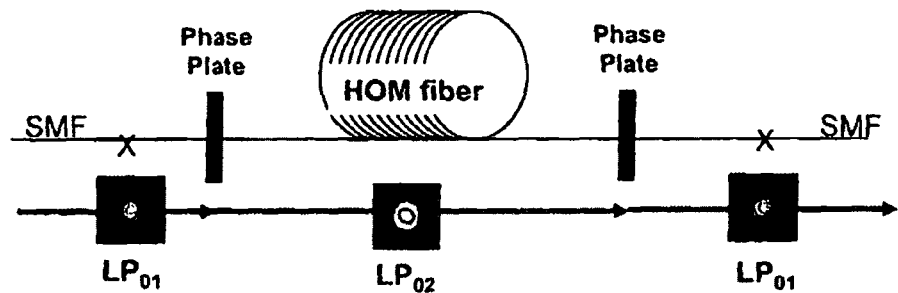
Figure 9:
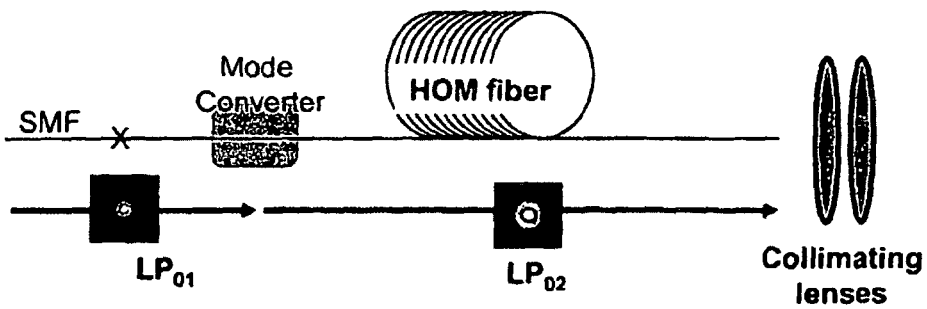

Optical devices using the aforementioned inventive fibers will require mode converters in order to introduce the optical signal into the preferred mode of the HOM fiber. Hence an incoming optical beam, usually Gaussian in spatial pattern because that is the mode of choice for conventional fibers as well as free-space beams, must be spatially converted into the preferred HOM with high efficiency. This can be readily achieved with suitably designed long-period fiber-gratings, whose operation as both static and dynamic mode converters is described in detail in U.S. Pat. Nos. 6,084,996 and 6,768,835. Fiber-grating mode-converters can achieve losses as low as 0.1 dB while providing mode conversion efficiencies as high as 99.99%, as experimentally demonstrated by Ramachandran et al, and described in *Optics Letters*, vol. 27, p. 698, 2002, entitled "Bandwidth control of long-period grating-based mode converters in few-mode fibers." An exemplary device construction using fiber gratings is shown in FIG. 9($a$), where the HOM fiber is connected to gratings at the input and output of the fiber, so as to ensure that the input as well as output of the device is a conventional Gaussian mode even though the preferred mode of operation inside the device may be different. The light source and optical path, represented by the arrows, may have any suitable wavelength but is preferably below 1300 nm. Also shown in this schematic are the modal-images of the conventional lower order mode (LOM), typically $LP_{01}$, and a desired HOM, preferably $LP_{02}$, that has the desired dispersive and stability properties. Constructed thus, the device can be concatenated to any other system, be it an Yb-doped fiber laser that requires positive dispersion inside the laser cavity, or a pulse delivery scheme for a Ti:Sapphire laser, where the device is used after light exits the solid-state laser (lasers and systems architectures not shown in Figure). Alternatively, discrete phase plates, as described by Ishaaya et al in *Optics Letters*, vol. 30, p. 1770, 2005, entitled "Intracavity coherent addition of single high-order modes." This schematic is shown in FIG. 9($b$). Several applications desire high power beam output that can be collimated, and not that they be Gaussian in shape. For such applications, the schematic of FIG. 9($c$) may be suitable, where an appropriate mode-converter transforms the incoming Gaussian mode into the desired HOM, but the output is simply collimated and relayed in free-space.

As described, the optical fiber device is designed for propagation of a higher order mode (HOM) in a section of optical waveguide, preferably an optical fiber, such that the total dispersion in the section of optical fiber is greater than the material dispersion in the section of optical waveguide. To achieve this, the optical waveguide/fiber supports propagation of the HOM as the main propagating mode, i.e. with most of the optical energy in the preferred HOM. As stated earlier, to ensure that most of the optical energy remains in the preferred HOM, i.e. is not mode converted, the preferred HOM has an effective refractive index that is different from the effective refractive index for any other mode by at least 0.0001. For the purpose of defining the invention, an optical fiber having this characteristic may be referred to as a few mode fiber, i.e., one that supports at least one mode in addition to a fundamental mode.

Various additional modifications of this invention will occur to those skilled in the art. All deviations from the specific teachings of this specification that basically rely on the principles and their equivalents through which the art has been advanced are properly considered within the scope of the invention as described and claimed.

The present invention is directed to optical fiber devices incorporating optical fibers with refractive index profiles that yield $D_{total}$>$D_m$ in any wavelength range such that $D_{total}$<+50 ps/nm-km, as would be desired in a variety of fiber devices exploiting optical nonlinearities. The aforementioned refractive index profile yields the given dispersion values when light resides substantially in a single higher order mode (HOM) of the fiber. Typically, this HOM would be the $LP_{02}$ mode of the fiber, but those skilled in the art will realize that such designs can be extended to other HOMs, such as the $LP_{11}$ or the $LP_{03}$ modes. We show exemplary profiles that provide small positive $D_{total}$ (<+50 ps/nm-km) in the wavelength range of 820-900 nm, as well as 1040-1160 nm, since these wavelength ranges are especially of interest for nonlinear fiber-optical devices, and it is in these wavelength ranges that conventional silica fiber has $D_{total}$<0, motivating the need for alternatives.

What is claimed is:

1. In an all-solid glass optical fiber having a material dispersion, a method comprising the steps of:
    propagating a signal in a higher-order mode (HOM) at a wavelength that is less than 1300 nm, the HOM having a total dispersion that is greater than the material dispersion of the all-solid glass optical fiber, the total dispersion being less than +50 ps/nm-km; and generating broadband supercontinua during propagation of the signal.

2. The method of claim 1, the step of generating broadband supercontinua comprising the step of:

generating solitons.

3. The method of claim 1, the step of propagating the signal comprising the step of:

propagating the signal at a wavelength between approximately 820 nm and approximately 900 nm.

4. The method of claim 1, the step of propagating the signal comprising the step of:

propagating the signal at a wavelength between approximately 1040 nm and approximately 1160 nm.

5. The method of claim 1, further comprising the step of:

generating derivative effects of broadband supercontinua.

6. An all-solid glass optical fiber configured to propagate a signal in a higher-order mode (HOM), the optical fiber having:

a material dispersion; and a total dispersion of the HOM that is greater than the material dispersion, the total dispersion being less than +50 ps/nm-km at wavelengths less than approximately 1300 nm, the all-solid glass optical fiber being configured to generate broadband supercontinua during propagation of the signal.

7. The optical fiber of claim 6, further being configured to generate derivative effects of broadband supercontinua during propagation of the signal.

8. The optical fiber of claim 6, further being configured to generate solitons during propagation of the signal.

9. The optical fiber of claim 6, the broadband supercontinua being generated when the signal wavelength is between approximately 820 nm and approximately 900 nm.

10. The system of claim 6, the broadband supercontinua being generated when the signal wavelength is between approximately 1040 nm and approximately 1160 nm.

* * * * *